United States Patent
Mignard et al.

(10) Patent No.: US 6,420,296 B2
(45) Date of Patent: *Jul. 16, 2002

(54) CATALYST COMPRISING A ZEOLITE Y GLOBALLY NON-DEALUMINATED AND CONTAINING BORON AND/OR SILICON

(75) Inventors: Samuel Mignard, Chatou; Nathalie George-Marchal, Saint Genis Laval; Slavik Kasztelan, Rueil Malmaison, all of (FR)

(73) Assignee: Institut Francais du Petrole (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,296

(22) Filed: May 5, 1999

(30) Foreign Application Priority Data

May 6, 1998 (FR) .............................. 98 05735

(51) Int. Cl.$^7$ .......................... B01J 29/10; B01J 29/16
(52) U.S. Cl. .................. 502/79; 502/305; 502/327; 502/332
(58) Field of Search .................. 502/79, 305, 327, 502/332

(56) References Cited

U.S. PATENT DOCUMENTS

| | | | | |
|---|---|---|---|---|
| 3,929,672 A | * | 12/1975 | Ward | 252/455 Z |
| 4,036,739 A | | 7/1977 | Ward | 208/120 |
| 4,477,336 A | * | 10/1984 | Scherzer | 208/120 |
| 4,517,073 A | | 5/1985 | Ward et al. | 208/111 |
| 4,826,587 A | * | 5/1989 | Ward et al. | 208/111 |
| 4,855,036 A | * | 8/1989 | Chiang et al. | 208/120 |
| 4,880,521 A | * | 11/1989 | Scherzer | 208/120 |
| 4,880,787 A | * | 11/1989 | Bundens et al. | 502/65 |
| 5,053,374 A | * | 10/1991 | Absil et al. | 502/64 |
| 5,275,720 A | * | 1/1994 | Ward | 208/111 |
| 5,340,957 A | * | 8/1994 | Clark | 208/59 |
| 5,468,368 A | * | 11/1995 | Baker, Jr. et al. | 208/58 |
| 5,525,209 A | | 6/1996 | Billon et al. | 208/59 |
| 5,576,258 A | * | 11/1996 | Chamberlain et al. | 502/73 |
| 5,641,395 A | | 6/1997 | Hettinger, Jr. et al. | 208/113 |
| 5,723,716 A | | 3/1998 | Brandes et al. | 585/734 |
| 5,730,858 A | | 3/1998 | Olivier et al. | 208/28 |
| 5,756,802 A | * | 5/1998 | Li et al. | 558/319 |
| 5,935,414 A | * | 8/1999 | Sonnemans et al. | 208/58 |
| 5,961,816 A | * | 10/1999 | Benazzi et al. | 208/111.3 |
| 5,972,204 A | * | 10/1999 | Corma Canos et al. | 208/114 |
| 5,997,725 A | * | 12/1999 | Benazzi et al. | 208/111.3 |
| 6,045,687 A | * | 4/2000 | Mignard et al. | 208/111.3 |
| 6,218,344 B1 | * | 4/2001 | Alario et al. | 502/226 |

FOREIGN PATENT DOCUMENTS

EP  0 372 632  6/1990

* cited by examiner

Primary Examiner—Bekir L. Yildirim
(74) Attorney, Agent, or Firm—Millen, White, Zelano & Branigan, P.C.

(57) ABSTRACT

A catalyst comprising 0.1–99.7% by weight of at least one alumina matrix; 0.1–80% by weight of at least one globally non dealuminated Y zeolite with a lattice parameter of more than 2.438 nm, a global $SiO_2/Al_2O_3$ mole ratio of less than 8, and a framework $SiO_2/Al_2O_3$ mole ratio of less than 21 and more than the global $SiO_2/Al_2O_3$ mole ratio; 0.1–30% by weight of at least one group VIII metal and/or 1–40% by weight of at least one group VIB metal (% oxide); 0.1–20% by weight of at least one promoter element selected from the group formed by boron and silicon (% oxide); 0–20% by weight of at least one group VIIA element; 0–20% by weight of phosphorous (% oxide); 0.1–20% by weight of at least one group VIIB element, useful for hydrocracking processes, especially at low pressures of 7.5 to 11 MPa.

24 Claims, No Drawings

CATALYST COMPRISING A ZEOLITE Y GLOBALLY NON-DEALUMINATED AND CONTAINING BORON AND/OR SILICON

The present invention relates to a catalyst for hydrocracking hydrocarbon-containing feeds, said catalyst comprising at least one metal selected from group VIB and group VIII (group 6 and groups 8, 9 and 10 in the new notation for the periodic table: Handbook of Chemistry and Physics, 76$^{th}$ edition, 1995–96), preferably molybdenum or tungsten, cobalt, nickel or iron, associated with a support comprising an amorphous or low crystallinity oxide type alumina and a non dealuminated Y zeolite with a lattice parameter of more than 2.438 nm. The alumina matrix of the catalyst comprises boron and/or silicon and optionally phosphorous, and optionally at least one element from group VIIA (group 17, the halogens), in particular fluorine, and optionally at least one group VIIB element.

The present invention also relates to processes for preparing said catalyst, and to its use for hydrocracking hydrocarbon-containing feeds such as petroleum cuts, or cuts from coal containing sulphur and nitrogen in the form of organic compounds, such feeds possibly containing metals and/or oxygen.

Conventional hydrocracking of petroleum feeds is a very important refining process which produces lighter fractions such as gasoline, jet fuel and light gas oil from surplus heavy feeds, which lighter fractions are needed by the refiner so that he can match production to demand. The importance of catalytic hydrocracking over catalytic cracking is that it can provide very good quality middle distillates, jet fuels and gas oils.

All catalysts used for hydrocracking are bifunctional, combining an acid function and a hydrogenating function. The acid function is supplied by large surface area supports (150 to 800 m$^2$/g in general) with a superficial acidity, such as halogenated aluminas (in particular fluorinated or chlorinated), combinations of boron and Aluminum oxides, amorphous silica-aluminas and zeolites. The hydrogenating function is supplied either by one or more metals from group VIII of the periodic table, such as iron, cobalt, nickel, ruthenium, rhodium, palladium, osmium, iridium or platinum, or by a combination of at least one metal from group VIB of the periodic table such as chromium, molybdenum or tungsten, and at least one group VIII metal, preferably non noble.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 or less), but have very good selectivity for middle distillates. In contrast, a strong acid function and a weak hydrogenating function produces very active catalysts but selectivities for middle distillates are poor. Further, a weak acid function is less sensitive to deactivation, in particular by nitrogen-containing compounds, than a strong acid function. The problem is thus the proper selection of each of the functions to adjust the activity/selectivity balance of the catalyst.

Weakly acid supports are generally constituted by amorphous or low crystallinity oxides. Weakly acidic supports include amorphous silica-aluminas. Certain catalysts on the hydrocracking market are constituted by silica-alumina combined with a combination of sulphides of groups VIB and VIII metals. Such catalysts enable feeds containing large quantities of heteroatomic poisons, sulphur and nitrogen, to be treated. The selectivity of such catalysts for middle distillates is very good. The disadvantage of such catalytic systems based on an amorphous support is their low activity.

Supports with a high acidity generally contain a dealuminated zeolite, for example a dealuminated Y type zeolite or USY (Ultra Stable Y zeolite), combined with a binder, for example alumina. Certain catalysts on the hydrocracking market are constituted by a dealuminated Y zeolite and an alumina combined either with a group VIII metal or with a combination of sulphides of group VIB and VIII metals. Such catalysts are preferably used to treat feeds containing less than 0.01% by weight of heteroatomic poisons, sulphur and nitrogen. Such systems are very active and the products formed are of high quality. The disadvantage of such catalytic systems based on a zeolitic support is that their selectivity for middle distillates is a little poorer than catalysts based on an amorphous support, and a high sensitivity to nitrogen content. Such catalysts can only tolerate low amounts of nitrogen in the feed, in general less than 100 ppm by weight.

The Applicant has discovered that to obtain a hydrocracking catalyst with good activity and good stability for feeds with high nitrogen contents, it is advantageous to combine an alumina type acidic amorphous oxide matrix doped with at least one element selected from boron and silicon, and optionally phosphorous and optionally at least one group VIIA element, in particular fluorine, with a highly acidic globally dealuminated Y zeolite.

The term "globally non dealuminated zeolite" means a Y zeolite with a faujasite structure ("Zeolite Molecular Sieves: Structure, Chemistry and Uses", D. W. BRECK, J. Wiley & Sons, 1973). The lattice parameter of this zeolite may have been reduced by extracting aluminum from the structure or framework during its preparation but the global $SiO_2/Al_2O_3$ ratio is not changed since the aluminum atoms have not been chemically extracted. The zeolite crystals thus contain aluminum extracted from the framework in the form of extra-framework aluminum. Such a globally non dealuminated zeolite thus has a silicon and aluminum composition, expressed as the global $SiO_2/Al_2O_3$ ratio, equivalent to the non dealuminated starting Y zeolite. This globally non dealuminated Y zeolite can be in its hydrogen form, i.e., at least partially exchanged with metal cations, for example using cations of alkaline-earth metals and/or cations of rare earth metals with atomic number 57 to 71 inclusive.

The catalyst of the present invention generally comprises at least one metal selected from the following groups in the following amounts, as a percentage by weight with respect to the total catalyst mass:

0.1% to 30% of at least one group VIII metal and/or 1–40% of at least one group VIB metal (% oxide);

1% to 99.7%, preferably 10% to 98%, more preferably 15% to 95%, of at least one amorphous or low crystallinity alumina matrix;

0.1% to 80%, or 0.1% to 60%, preferably 0.1% to 50%, of at least one globally non dealuminated Y zeolite with a lattice parameter of more than 2.438 nm, a global $SiO_2/Al_2O_3$ mole ratio of less than 8, and a framework $SiO_2/Al_2O_3$ mole ratio, calculated using the Fichtner-Schmittler correlation (Cryst. Res. Tech. 1984, 19, K1) of less than 21 and above the global $SiO_2/Al_2O_3$ ratio;

0.1% to 20%, preferably 0.1% to 15%, more preferably 0.1% to 10%, of at least one promoter element selected from the group formed by boron and silicon (% oxide);

and optionally:
- 0 to 20%, preferably 0.1% to 15%, more preferably 0.1% to 10%, of phosphorous (% oxide);
- 0 to 20%, preferably 0.1% to 15%, more preferably 0.1% to 10% by weight, of at least one element selected from group VIIA, preferably fluorine;
- 0 to 20%, preferably 0.1% to 15%, more preferably 0.1% to 10% by weight, of at least one element selected from group VIIB, preferably manganese or rhenium.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is more than 140 m$^2$/g, the pore volume measured using a mercury porisimeter is in the range 0.2 to 1.5 cm$^3$/g and the pore size distribution may be unimodal, bimodal or polymodal. Preferably, the distribution of the catalysts of the present invention is unimodal.

The activity of said catalyst for hydrocracking vacuum gas oil type cuts is higher than that of known catalytic formulae of the prior art. Without wishing to be bound by any particular theory, it appears that the particularly high activity of the catalysts of the present invention is due to a reinforcement in the acidity of the catalyst by the presence of an alumina matrix acidified by the addition of boron and/or silicon, which also improves the hydrodenitrogenation properties of the active phase comprising at least one group VIB metal and optionally at least one group VIII metal, and by the presence of the highly acidic Y zeolite a large portion of the acidity of which will be neutralised by nitrogen-containing compounds, but the acidic sites which remain under the operating conditions will result in sufficient hydrocracking activity for the catalyst.

The catalyst of the present invention can be prepared using any of the methods which are known to the skilled person.

Advantageously, it is obtained by mixing a source of alumina, optionally doped with boron and/or silicon, and a source of the starting Y zeolite, the mixture then being formed. All or a portion of the group VIII and/or VIB elements, the group VIIA element and the phosphorous is introduced during mixing, or all of it can be introduced after forming (preferred). Forming is followed by calcining at a temperature of 250° C. to 600° C. One preferred forming method consists of mixing the starting Y zeolite in a moist alumina gel for a few tens of minutes, then passing the paste obtained through a die to form extrudates with a diameter which is preferably in the range 0.4 to 4 mm.

The alumina source is normally selected from the group formed by alumina gels and alumina powders obtained by calcining aluminum hydroxides and oxyhydroxides. Preferably, matrices containing alumina are used, in any of the forms known to the skilled person, for example gamma alumina.

The preferred Y zeolite source is a Y zeolite powder characterized by different specifications: a lattice parameter of more than 2.451 nm; a global SiO$_2$/Al$_2$O$_3$ mole ratio of less than 8, a framework SiO$_2$/Al$_2$O$_3$ mole ratio, calculated using the Fichtner-Schmittler correlation (Cryst. Res. Tech. 1984, 19, K1) of less than 11; a sodium content of less than 0.2% by weight determined for the zeolite calcined at 1100° C.; and a specific surface area, determined using the BET method, of more than about 400 m$^2$/g, preferably more than 600 m$^2$/g.

The catalyst also comprises a hydrogenating function. The hydrogenating function is provided by at least one metal or compound of a metal from group VIB such as molybdenum or tungsten. A combination of at least one metal or compound of a metal from group VIB of the periodic table (in particular molybdenum or tungsten) and at least one metal or compound of a metal from group VIII of the periodic table, preferably non noble (in particular cobalt or nickel) can be used.

The hydrogenating function as defined above can be introduced into the catalyst at various stages of the preparation and in various manners. It can be introduced only partially (in the case, for example of combinations of oxides of groups VIB and VIII metals) or completely on mixing the alumina source, the remaining hydrogenating element(s) then being introduced after mixing, more generally after calcining. Preferably, the group VIII metal is introduced simultaneously with or after the group VIB metal, regardless of its mode of introduction. It can be introduced by one or more ion exchange operations carried out on the calcined support constituted by the zeolite dispersed in the alumina matrix, using solutions containing precursor salts of the selected metals when these are from group VIII. It can be introduced by one or more steps for impregnating the formed and calcined support using a solution of precursors of group VIII metal oxides (in particular cobalt or nickel) when the precursors of the group VIB metal oxides (in particular molybdenum or tungsten) have already been introduced on mixing the support. Finally, it can also be introduced by one or more steps for impregnating the calcined support constituted by the zeolite and alumina matrix, optionally doped with B, Si, P and/or F, using solutions containing precursors of oxides of group VIB and/or group VIII metals, the precursors of the oxides of the group VIII metal preferably being introduced after those of group VIB or at the same time as the latter.

When the elements are introduced in a plurality of steps for impregnating the corresponding precursor salts, an intermediate calcining step must be carried out on the catalyst at a temperature in the range 250° C. to 600° C.

The sources of the group VIB element which can be used are well known to the skilled person. As an example, preferred sources of molybdenum and of tungsten are ammonium salts and oxides such as ammonium molybdate, ammonium heptamolybdate and ammonium tungstate.

The sources of the group VIII element which can be used are well known to the skilled person. As an example, nitrates, sulphates and halides can be used.

The sources of the group VIIB elements which can be used are well known to the skilled person. Preferably, ammonium salts, nitrates and chlorides are used.

The phosphorous can be introduced into the catalyst at various stages in the preparation and in a variety of manners. One preferred method consists of preparing an aqueous solution of at least one group VIB element and optionally at least one group VIII element and a phosphorous compound and carrying out dry impregnation, in which the pore volume of the precursor is filled with the solution containing the group VIB metal, the optional group VIII metal, phosphorous and the optional group VIIA element.

Molybdenum and/or tungsten impregnation can be facilitated by adding phosphoric acid to the solutions, which enables phosphorous to be introduced as well to promote the catalytic activity. Other phosphorous compounds can be used, as is well known to the skilled person.

The phosphorous and the element selected from group VIIA halide ions can be introduced by one or more impregnation operations using an excess of solution, carried out on the calcined precursor.

The preferred phosphorous source is orthophosphoric acid $H_3PO_4$, but its salts and esters such as ammonium phosphates are also suitable. Phosphomolybdic acid and its salts, phosphotungstic acid and its salts can advantageously be used. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

Introducing boron requires an aqueous solution containing boron (B) to be deposited. One preferred method consists of preparing an aqueous solution of at least one boron salt such as ammonium biborate or ammonium pentaborate in an alkaline medium and in the presence of water and carrying out "dry" impregnation, in which the pore volume of the precursor is filled with the solution containing the B. This method for depositing B is better than the conventional method employing an alcoholic solution of boric acid.

The B and the optional element selected from group VIIA, the halogens, preferably fluorine (F), can be introduced into the catalyst at various stages of the preparation and in various manners.

The phosphorous (P), B and the element selected from halide ions of group VIIA can be separately introduced into the calcined precursor using one or more impregnation operations with an excess of solution.

Thus, for example, in the preferred case where, for example, the precursor is a catalyst of the nickel-molybdenum-phosphorous supported on alumina-Y zeolite type, it is possible to impregnate this precursor with an aqueous solution of biborate, to dry, for example at 80° C., then to impregnate with a solution of ammonium fluoride, to dry, for example at 80° C., and to calcine, for example and preferably in air in a traversed bed, for example at 500° C. for 4 hours.

Introducing silicon requires an aqueous solution containing silicon to be deposited. One preferred method of the invention consists of preparing an aqueous solution containing a silicone type silicon (Si) compound in the form of an emulsion and to carry out "dry" impregnation, in which the pore volume of the precursor is filled with the solution containing the Si. This method for depositing Si is better than the conventional method employing an alcoholic solution of ethyl orthosilicate in alcohol.

A variety of silicon sources can be used. Examples are ethyl orthosilicate $Si(OEt)_4$, silicones, siloxanes, polysiloxanes, and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can be added, for example, by impregnation using an emulsion of a silicone in water.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF4$ or sodium fluorosilicate $Na_2SiF_6$. Fluorine can be introduced, for example, by impregnating an aqueous hydrofluoride or ammonium fluoride solution.

The catalysts obtained are used for hydrocracking, in particular of vacuum distillate, deasphalted residues or hydrotreated type heavy hydrocarbon-containing feeds. The heavy feeds are preferably constituted by at least 80% by volume of compounds with boiling points of at least 350° C., preferably in the range 350° C. to 580° C. They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally more than 200° C. and usually in the range 250° C. to 480° C. The pressure is more than 0.1 MPa and usually more than 1 MPa. The hydrogen recycle ratio is a minimum of 50 and usually in the range 80 to 5000 normal liters of hydrogen per liter of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C. to 600° C., generally in a traversed bed reaction zone.

Finally, the composition of the catalyst renders it easy to regenerate.

The catalyst can be used under variable hydrocracking conditions with pressures of at least 2 MPa, a reaction temperature of at least 230° C., an $H_2$/feed ratio of at least 100 Nl $H_2$/l of feed and an hourly space velocity of 0.1–10 $h^{-1}$.

The initial boiling point of the hydrocarbon-containing feeds treated is at least 150° C., preferably at least 350° C., more advantageously a cut boiling between 350–580° C.

The catalyst of the present invention can be used for hydrocracking a variety of hydrocarbon-containing cuts, for example vacuum distillate type cuts containing large amounts of sulphur and nitrogen. In a first partial hydrocracking implementation, the degree of conversion is below 55%. The catalyst of the invention is thus used at a temperature which is generally 230° C. or more, or 300° C., generally at most 480° C., and usually in the range 350° C. to 450° C. The pressure is generally more than 2 MPa and 12 MPa or less. A moderate pressure range is of particular interest, namely 7.5–11 MPa, preferably 7.5–10 MPa or 8–11 MPa, advantageously 8.5–10 MPa. The quantity of hydrogen is a minimum of 100 normal liters of hydrogen per liter of feed and usually in the range 200 to 3000 normal liters of hydrogen per liter of feed. The hourly space velocity is generally in the range 0.1 to 10 $h^{-1}$. Under these conditions, the catalysts of the present invention have better activities for conversion, hydrodesulphuration and hydrodenitrogenation than commercially available catalysts.

In this implementation, the catalyst of the present invention can be used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst used in the first step has a hydrotreatment function and comprises a matrix, preferably alumina-based, preferably containing no zeolite, and at least one metal with a hydrogenating function. Said matrix can also be constituted by, or comprise, silica, silica-alumina, boron oxide, magnesia, zirconia, titanium oxide or a combination of these oxides. The hydrotreatment function is ensured by at least one metal or compound of a metal from group VIII, such as nickel or cobalt. A combination of at least one metal or compound of a metal from group VIB (in particular molybdenum or tungsten) and at least one metal or compound of a metal from group VIII (in particular cobalt or nickel) can be used. The total concentration of groups VIB and VIII metal oxides is preferably in the range 5% to 40% by weight, preferably in the range 7% to 30% by weight, and the weight ratio, expressed as the metal oxide of the group VIB metal (or metals) to that of the group VIII metal (or metals), is in the range 1.25 to 20, preferably in the range 2 to 10. Further, this catalyst can contain phosphorous. The phosphorous content, expressed as the concentration of phosphorous pentoxide $P_2O_5$, is generally at most 15%, preferably in the range 0.1% to 15% by weight, and more preferably in the range 0.15% to 10% by weight. It can also contain boron in a ratio B/P=1.05–2 (atomic), the sum of the B and P contents, expressed as the oxides, being in the range 5% to 15% by weight.

The first step is generally carried out at a temperature of 350–460° C., preferably 360–450° C.; at a total pressure of 2 to 12 MPa, preferably 7.5–11 MPa, 7.5–10 MPa or 8–11 MPa or 8.5–10 MPa; and the hourly space velocity is 0.1–5 $h^{-1}$, preferably 0.2–2 $h^{-1}$, with a quantity of hydrogen at least 100 Nl/Nl of feed, preferably 260–3000 Nl/Nl of feed.

In the conversion step using the catalyst of the invention (or second step), the temperatures are generally 230° C. or more and usually in the range 300° C. to 430° C. The pressure is generally in the range 2 to 12 MPa, preferably 7.5–11 MPa or 7.5–10 MPa or 8–11 MPa or 8.5–10 MPa. The quantity of hydrogen is a minimum of 100 l/l of feed and usually in the range 200 to 3000 liters of hydrogen per liter of feed. The hourly space velocity is generally in the range 0.15 to 10 $h^{-1}$.

Under these conditions, the activities of the catalysts of the present invention are better for conversion, hydrodesulphuration, and hydrodenitrogenation and the selectivity for middle distillates is better than that of commercially available catalysts. The service life of the catalysts is also improved in the moderate pressure range.

In a second implementation, the catalyst of the present invention can be used for hydrocracking under high hydrogen pressure conditions of at least 8.5 MPa, preferably at least 9 MPa or at least 10 MPa. The treated cuts are, for example, vacuum distillates containing high sulphur and nitrogen contents which have already been hydrotreated. In this hydrocracking mode, the degree of conversion is more than 55%. In this case, the petroleum cut conversion process is carried out in two steps, the catalyst of the invention being used in the second step.

The catalyst for the first step has a hydrotreatment function and comprises a matrix, preferably alumina-based, preferably containing no zeolite, and at least one metal with a hydrogenating function. Said matrix can also be constituted by, or comprise, a silica, silica-alumina, boron oxide, magnesia, zirconia, titanium oxide or a combination of these oxides. The hydro-dehydrogenating function is ensured by at least one group VIII metal or compound of a metal such as nickel or cobalt. A combination of at least one metal or compound of a metal from group VIB (in particular molybdenum or tungsten) and at least one metal or compound of a metal from group VIII (in particular cobalt or nickel) can be used. The total concentration of group VIB and VIII metal oxides is in the range 5% to 40% by weight, preferably in the range 7% to 30% by weight, and the weight ratio, expressed as the metal oxide of the group VIB metal (or metals) to that of the group VIII metal (or metals) is preferably in the range 1.25 to 20, more preferably in the range 2 to 10. Further, this catalyst can contain phosphorous. The phosphorous content, expressed as the concentration of phosphorous pentoxide $P_2O_5$, is at most 15%, preferably in the range 0.1% to 15% by weight, and more preferably in the range 0.15% to 10% by weight. It can also contain boron in a ratio B/P=1.02–2 (atomic), the sum of the B and P contents, expressed as the oxides, preferably being in the range 5% to 15% by weight.

The first step is generally carried out at a temperature of 350–460° C., preferably 360–450° C.; the pressure is more than 8.5 MPa, preferably more than 10 MPa; the hourly space velocity is 0.1–5 $h^{-1}$, preferably 0.2–2 $h^{-1}$; and the quantity of hydrogen is at least 100 Nl/Nl of feed, preferably 260–3000 Nl/Nl of feed.

For the conversion step using the catalyst of the invention (or second step), the temperatures are generally 230° C. or more, usually in the range 300° C. to 430° C. The pressure is generally more than 8.5 MPa, preferably more than 10 MPa. The quantity of hydrogen is a minimum of 100 l/l of feed, usually in the range 200 to 3000 liters of hydrogen per liter of feed. The hourly space velocity is generally in the range 0.15 to 10 $h^{-1}$.

Under these conditions, the activities of the catalysts of the present invention are better for conversion and the selectivity for middle distillates is better than that for commercially available catalysts, even though the zeolite contents are considerably lower than those of commercially available catalysts.

The following examples illustrate the present invention without in any way limiting its scope.

EXAMPLE 1

Preparation of a support containing a non dealuminated Y zeolite

Large quantities of a hydrocracking catalyst support containing a globally non dealuminated Y zeolite were produced so as to enable different catalysts based on the same support to be prepared. To this end, 19.7% by weight of a non dealuminated Y zeolite with a lattice parameter of 2.453 nm, a global $SiO_2/Al_2O_3$ ratio of 6.6 and a framework $SiO_2/Al_2O_3$ ratio of 8.6 was used, which was mixed with 80.3% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 351 $m^2/g$, a pore volume of 0.58 $cm^3/g$ and a unimodal pore size distribution centered on 10 nm. An X ray diffraction analysis of the matrix revealed that it was composed of low crystallinity cubic gamma alumina and Y zeolite with a lattice parameter of 2.444 nm, a global $SiO_2/Al_2O_3$ ratio of 6.7 with a framework $SiO_2/Al_2O_3$ ratio of 13.9.

EXAMPLE 2

Preparation of hydrocracking catalysts containing a non dealuminated Y zeolite

Extrudates of the support containing a non dealuminated Y zeolite with a lattice parameter of 2.444 nm, a global $SiO_2/Al_2O_3$ ratio of 6.7 and a framework $SiO_2/Al_2O_3$ ratio of 13.9 prepared in Example 1 were dry impregnated with an aqueous solution of a mixture of ammonium heptamolybdate and nickel nitrate, dried overnight at 120° C. in air and finally calcined at 550° C. in air. The oxide weight contents of catalyst CZ3 obtained are shown in Table 1. The final CZ3 catalyst contained 16.6% by weight of Y zeolite. X ray diffraction analysis of the matrix revealed that it was composed of low crystallinity cubic gamma alumina and Y zeolite with a lattice parameter of 2.444 nm, a global $SiO_2/Al_2O_3$ ratio of 6.6 and a framework $SiO_2/Al_2O_3$ ratio of 14.2.

Catalyst CZ3 was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ3B was obtained: NiMo/alumina-Y doped with boron. In the same way, catalyst CZ3Si was prepared by impregnating catalyst CZ3 with a Rhodorsil EP1 (Rhone-Poulenc) silicone emulsion. The impregnated extrudates were dried overnight at 120° C. then calcined at 550° C. for 2 hours in dry air. Finally, catalyst CZ3BSi was prepared by impregnating catalyst CZ3 with an aqueous solution comprising ammonium biborate and Rhodorsil EP1 (Rhone-Poulenc) silicone emulsion. The impregnated extrudates were dried overnight at 120° C. then calcined at 550° C. for 2 hours in dry air.

Extrudates of the support containing the Y zeolite of Example 1 were also dry impregnated with an aqueous solution of a mixture of ammonium heptamolybdate, nickel nitrate and orthophosphoric acid, dried overnight at 120° C. in air and finally calcined at 550° C. in air. The oxide weight contents of catalyst CZ3P obtained are shown in Table 1. The final CZ3P catalyst contained 15.7% by weight of Y zeolite. X ray diffraction analysis of the matrix revealed that it was composed of low crystallinity cubic gamma alumina and Y zeolite with a lattice parameter of 2.444 nm, a global $SiO_2/Al_2O_3$ ratio of 6.7 and a framework $SiO_2/Al_2O_3$ ratio of 14.7.

Catalyst CZ3P was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ3BP was obtained: NiMoP/alumina-Y doped with boron.

A catalyst CZ3PSi was prepared using the same procedure as for catalyst CZ3PB, replacing the boron precursor in the impregnation solution with Rhodorsil EP1 (Rhone-Poulenc) silicone emulsion.

Finally, catalyst CZ3PBSi was prepared by impregnating catalyst CZ3P with an aqueous solution comprising ammonium biborate and Rhodorsil EP1 (Rhone-Poulenc) silicone emulsion. The other steps of the procedure were the same as those indicated above. The characteristics of catalysts CZ3 are summarised in Table 1.

TABLE 1

Characteristics of CZ3 catalysts

| Catalyst | CZ3 | CZ3 P | CZ3 B | CZ3 Si | CZ3 BSi | CZ3 PB | CZ3 PSi | CZ3 PBSi |
|---|---|---|---|---|---|---|---|---|
| $MoO_3$ (wt %) | 13.1 | 12.5 | 12.8 | 12.8 | 12.5 | 12.3 | 12.3 | 12.1 |
| NiO (wt %) | 2.84 | 2.7 | 2.8 | 2.8 | 2.7 | 2.7 | 2.7 | 2.6 |
| $P_2O_5$ (wt %) | 0 | 5.2 | 0 | 0 | 0 | 5.1 | 5.1 | 5.0 |
| $B_2O_3$ (wt %) | 0 | 0 | 2.45 | 0 | 2.4 | 2.3 | 0 | 2.3 |
| $SiO_2$ (wt %) | 0 | 0 | 0 | 2.2 | 2.2 | 0 | 2.3 | 2.2 |
| $Al_2O_3$ (wt %) | 67.5 | 63.8 | 65.8 | 66.0 | 64.4 | 62.3 | 62.3 | 60.9 |
| Y (wt %) | 16.6 | 15.7 | 16.1 | 16.2 | 15.8 | 15.3 | 15.3 | 14.9 |

EXAMPLE 3

Preparation of a support containing a small amount of non dealuminated Y zeolite Large quantities of a hydrocracking catalyst support containing a small amount of a globally non dealuminated Y zeolite were produced so as to enable different catalysts based on the same support to be prepared. To this end, 8.6% by weight of a non dealuminated Y zeolite with a lattice parameter of 2.453 nm, a global $SiO_2/Al_2O_3$ ratio of 6.6 and a framework $SiO_2/Al_2O_3$ ratio of 8.6 was used, which was mixed with 91.4% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 259 $m^2/g$, and a pore volume of 0.57 $cm^3/g$ and a unimodal pore size distribution centered on 10 nm. An X ray diffraction analysis of the matrix revealed that it was composed of low crystallinity cubic gamma alumina and Y zeolite with a lattice parameter of 2.444 nm, a global $SiO_2/Al_2O_3$ ratio of 6.7 with a framework $SiO_2/Al_2O_3$ ratio of 14.1.

EXAMPLE 4

Preparation of catalysts containing a small amount of non dealuminated Y zeolite Extrudates of the support containing a small amount of non dealuminated Y zeolite with a lattice parameter of 2.444 nm, a global $SiO_2/Al_2O_3$ ratio of 6.7 and a framework $SiO_2/Al_2O_3$ ratio of 14.1 prepared in Example 3 were dry impregnated with an aqueous solution of a mixture of ammonium heptamolybdate and nickel nitrate, dried overnight at 120° C. in air and finally calcined at 550° C. in air. The oxide weight contents of catalyst CZ5 obtained are shown in Table 2. The final CZ5 catalyst contained 7.1% by weight of Y zeolite with a lattice parameter of 2.444 nm, a global $SiO_2/Al_2O_3$ ratio of 6.8 and a framework $SiO_2/Al_2O_3$ ratio of 14.9.

Catalyst CZ5 was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ5B was obtained. In the same way, catalyst CZ5Si was prepared by impregnating catalyst CZ5 with a Rhodorsil EP1 (Rhone-Poulenc) silicone emulsion. The impregnated extrudates were dried overnight at 120° C. then calcined at 550° C. for 2 hours in dry air. Finally, catalyst CZ5BSi was prepared by impregnating catalyst CZ5 with an aqueous solution comprising ammonium biborate and Rhodorsil EP1 (Rhone-Poulenc) silicone emulsion. The impregnated extrudates were dried overnight at 120° C. then calcined at 550° C. for 2 hours in dry air.

Extrudates of the support containing the Y zeolite of Example 3 were also dry impregnated with an aqueous solution of a mixture of ammonium heptamolybdate, nickel nitrate and orthophosphoric acid, dried overnight at 120° C. in air and finally calcined at 550° C. in air. The oxide weight contents of catalyst CZ5P obtained are shown in Table 2.

Catalyst CZ5P was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ5BP was obtained: NiMoP/alumina-Y doped with boron.

A catalyst CZ5PSi was prepared using the same procedure as for catalyst CZ5PB, replacing the boron precursor in the impregnation solution with Rhodorsil EP1 (Rhone-Poulenc) silicone emulsion.

Finally, catalyst CZ5PBSi was prepared by impregnating catalyst CZ5P with an aqueous solution comprising ammonium biborate and Rhodorsil EP1 (Rhone-Poulenc) silicone emulsion. The other steps of the procedure was the same as those indicated above. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst CZ5PBSiF was obtained. The characteristics of catalysts CZ5 are summarised in Table 2.

TABLE 2

Characteristics of CZ5 catalysts

| Catalyst | CZ5 | CZ5 P | CZ5 B | CZ5 Si | CZ5 BSi | CZ5 PB | CZ5 PSi | CZ5 PBSi | CZ5 PBSiF |
|---|---|---|---|---|---|---|---|---|---|
| $MoO_3$ (wt %) | 15.2 | 14.6 | 14.8 | 14.9 | 14.5 | 14.3 | 14.3 | 14.0 | 13.7 |
| NiO (wt %) | 2.8 | 2.7 | 2.7 | 2.7 | 2.7 | 2.7 | 2.6 | 2.6 | 2.5 |
| $P_2O_5$ (wt %) | 0 | 4.6 | 0 | 0 | 0 | 4.5 | 4.5 | 4.4 | 4.35 |
| $B_2O_3$ (wt %) | 0 | 0 | 2.3 | 0 | 2.3 | 2.1 | 0 | 2.1 | 2.1 |
| $SiO_2$ (wt %) | 0 | 0 | 0 | 2.1 | 2.2 | 0 | 2.45 | 2.3 | 2.3 |
| F (wt %) | 0 | 0 | 0 | 0 | 0 | 0 | 0 | 0 | 1.1 |
| $Al_2O_3$ (wt %) | 74.9 | 71.4 | 73.2 | 73.4 | 71.5 | 69.8 | 69.6 | 68.1 | 67.5 |
| Y (wt %) | 7.1 | 6.7 | 6.9 | 6.9 | 6.7 | 6.6 | 6.6 | 6.4 | 6.4 |

Catalyst CZ5P was then impregnated with an aqueous solution comprising manganese nitrate. After ageing at room temperature in an atmosphere saturated with water, the impregnated extrudates were dried overnight at 120° C. then calcined at 550° C. for 2 hours in dry air. Catalyst CZ5PMn was obtained. This catalyst was then impregnated with an aqueous solution comprising ammonium biborate and Rhodorsil EP1 (Rhone-Poulenc) silicone emulsion. The impregnated extrudates were then dried overnight at 120° C. and calcined at 50° C. for 2 hours in dry air to obtain catalyst CZ5PMnBSi. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst CZ5PMnBSiF was obtained. The characteristics of catalysts CZ5 are summarised in Table 3.

TABLE 3

Characteristics of CZ5 catalysts containing manganese

| Catalyst | CZ5 PMn | CZ5 PMnBSi | CZ5 PMnBSiF |
|---|---|---|---|
| $MoO_3$ (wt %) | 14.4 | 13.8 | 13.6 |
| NiO (wt %) | 2.7 | 2.5 | 2.5 |
| $MnO_2$ (wt %) | 1.2 | 1.2 | 1.15 |
| $P_2O_5$ (wt %) | 4.4 | 4.2 | 4.1 |
| $B_2O_3$ (wt %) | 0 | 2.05 | 2.0 |
| $SiO_2$ (wt %) | 0 | 2.3 | 2.3 |
| F (wt %) | 0 | 0 | 0.85 |
| $Al_2O_3$ (wt %) | 70.7 | 67.6 | 67.0 |
| Y (wt %) | 6.6 | 6.4 | 6.3 |

EXAMPLE 5

Preparation of a support containing non dealuminated Y zeolite and a silica-alumina We produced a silica-alumina powder by co-precipitating of a composition of 4% $SiO_2$, 96% $Al_2O_3$. A support for a hydrocracking catalyst containing this silica-alumina and a non globally dealuminated Y zeolite was then produced. To this end, 19.5% by weight of a non dealuminated Y zeolite with a lattice parameter of 2.453 nm, a global $SiO_2/Al_2O_3$ ratio of 6.6 and a framework $SiO_2/Al_2O_3$ ratio of 8.6 was used, which was mixed with 80.5% by weight of a matrix composed of the silica-alumina prepared as above. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 365 $m^2/g$, a pore volume of 0.53 $cm^3/g$ and a unimodal pore size distribution centered on 11 nm. An X ray diffraction analysis of the matrix revealed that it was composed of low crystallinity cubic gamma alumina and Y zeolite with a lattice parameter of 2.444 nm, a global $SiO_2/Al_2O_3$ ratio of 6.8 with a framework $SiO_2/Al_2O_3$ ratio of 14.7.

EXAMPLE 6

Preparation of catalysts containing a non dealuminated Y zeolite and a silica-alumina Extrudates of the support containing a non dealuminated Y zeolite with a lattice parameter of 2.444 nm, a global $SiO_2/Al_2O_3$ ratio of 6.8 and a framework $SiO_2/Al_2O_3$ ratio of 14.7 prepared in Example 5 were dry impregnated with an aqueous solution of a mixture of ammonium heptamolybdate and nickel nitrate, dried overnight at 120° C. in air and finally calcined at 550° C. in air. The oxide weight contents of catalyst CZ17 obtained are shown in Table 1. The final CZ17 catalyst contained 16.3% by weight of Y zeolite. X ray diffraction analysis of the matrix revealed that it was composed of low crystallinity cubic gamma alumina and Y zeolite with a lattice parameter of 2.444 nm, a global $SiO_2/Al_2O_3$ ratio of 6.6 and a framework $SiO_2/Al_2O_3$ ratio of 14.2.

Catalyst CZ17 was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ17B was obtained Extrudates of the support containing the Y zeolite of Example 1 were also dry impregnated with an aqueous solution of a mixture of ammonium heptamolybdate, nickel nitrate and orthophosphoric acid, dried overnight at 120° C. in air and finally calcined at 550° C. in air. The oxide weight contents of catalyst CZ17P obtained are shown in Table 4. The final CZ17P catalyst contained 15.4% by weight of Y zeolite. X ray diffraction analysis of the matrix revealed that it was composed of low crystallinity cubic gamma alumina and Y zeolite with a lattice parameter of 2.444 nm, a global $SiO_2/Al_2O_3$ ratio of 6.7 and a framework $SiO_2/Al_2O_3$ ratio of 14.7.

Catalyst CZ17P was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ17BP was obtained.

The characteristics of catalysts CZ17 are summarised in Table 4.

TABLE 4

Characteristics of CZ17 catalysts

| Catalyst | CZ17 | CZ17 P | CZ17 B | CZ17 PB |
|---|---|---|---|---|
| $MoO_3$ (wt %) | 13.4 | 12.7 | 13.1 | 12.5 |
| NiO (wt %) | 2.9 | 2.8 | 2.9 | 2.7 |
| $P_2O_5$ (wt %) | 0 | 5.3 | 0 | 5.2 |
| $B_2O_3$ (wt %) | 0 | 0 | 2.15 | 2.2 |
| $SiO_2$ (wt %) | 2.68 | 2.53 | 2.6 | 2.5 |
| $Al_2O_3$ (wt %) | 64.7 | 61.2 | 63.8 | 59.8 |
| Y (wt %) | 16.3 | 15.4 | 15.9 | 15.1 |

EXAMPLE 7

Comparison of catalysts for low pressure hydrocracking of a vacuum gas oil

The catalysts prepared in the above Examples were employed under moderate pressure hydrocracking conditions using a petroleum feed with the following principal characteristics:

| Initial point | 365° C. |
|---|---|
| 10% point | 430° C. |
| 50% point | 472° C. |
| 90% point | 504° C. |
| End point | 539° C. |
| Pour point | +39° C. |
| Density (20/4) | 0.921 |
| Sulphur (weight %) | 2.46 |
| Nitrogen (ppm by weight) | 1130 |

The catalytic test unit comprised two fixed bed reactors in upflow mode. 40 ml of catalyst was introduced into each of the reactors. The catalyst for the first hydrotreatment step of the process, HTH548 from Procatalyse, comprising a group VIB element and a group VIII element deposited on alumina, was introduced into the first reactor, through which the feed passed first. A hydrocracking catalyst (CZ5 series) was introduced into the second reactor, through which the feed passed last. The two catalysts underwent in-situ sulphurisation before the reaction. It should be noted that any in-situ or ex-situ sulphurisation method is suitable. Once sulphurisation had been carried out, the feed described above could be transformed. The total pressure was 8.5 MPa, the hydrogen flow rate was 500 liters of gaseous hydrogen per liter of injected feed, and the hourly space velocity was 0.8 $h^{-1}$. The two reactors operated at the same temperature.

The catalytic performances are expressed as the gross conversion at 400° C. (GC), the gross selectivity for middle distillates (150–380° C. cut) (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100* weight of (150° C.–380° C.) fraction/weight of 380° C.$^{minus}$ fraction of effluent.

The hydrodesulphuration conversion HDS is taken to be:

HDS=$(S_{initial}-S_{effluent})/S_{initial}$* 100=(24600-$S_{effluent}$)/ 24600*100

The hydrodenitrogenation conversion HDN is taken to be:

HDN=$(N_{initial}-N_{effluent})/N_{initial}$*100=(1130-$N_{effluent}$)/ 1130*100

Table 5 shows the gross conversion GC at 400° C., the gross selectivity GS, the hydrodesulphuration conversion HDS and the hydrodenitrogenation conversion HDN for the test catalysts.

TABLE 5

Catalytic activities for catalysts for partial hydrocracking at 400° C.

| | | GC (wt %) | GS (wt %) | HDS (%) | HDN (%) |
|---|---|---|---|---|---|
| CZ3 | NiMo/Y | 50.9 | 79.8 | 98.9 | 97.1 |
| CZ3P | NiMoP/Y | 52.2 | 79.0 | 99.4 | 98.4 |
| CZ3B | NiMoB/Y | 53.3 | 79.1 | 99.4 | 98.4 |
| CZ3Si | NiMoSi/Y | 54.3 | 79.3 | 99.4 | 98.6 |
| CZ3BSi | NiMoBSi/Y | 54.9 | 79.5 | 99.5 | 98.8 |
| CZ3PB | NiMoPB/Y | 53.5 | 79.0 | 99.3 | 98.5 |
| CZ3PSi | NiMoPSi/Y | 53.9 | 79.0 | 99.25 | 98.5 |
| CZ3PBSi | NiMoPBSi/Y | 54.8 | 78.9 | 99.4 | 98.9 |

The results of Table 5 show that the performances-of catalyst CZ3 were greatly improved when B and/or silicon was/were added. The improvement in the gross conversion in particular should be noted, while the selectivity for middle distillates remained constant. Further, the presence of boron and/or silicon tended to substantially improve the HDS and HDN.

TABLE 6

Catalytic activities for catalysts CZ3 and CZ17 with equivalent compositions for partial hydrocracking at 400° C.

|  |  | GC (wt %) | GS (wt %) | HDS (%) | HDN (%) |
|---|---|---|---|---|---|
| CZ17 | NiMo/Y—SiAl | 53.3 | 78.9 | 97.8 | 97.1 |
| CZ3Si | NiMoSi/Y | 54.3 | 79.3 | 99.4 | 98.6 |
| CZ17P | NiMoP/Y—SiAl | 53.2 | 79.1 | 98.25 | 97.5 |
| CZ3PSi | NiMoPSi/Y | 53.9 | 79.0 | 99.25 | 98.5 |
| CZ17B | NiMoB/Y—SiAl | 53.7 | 79.1 | 98.3 | 97.1 |
| CZ3BSi | NiMoBSi/Y | 54.9 | 79.5 | 99.5 | 98.8 |
| CZ17PB | NiMoPB/Y—SiAl | 53.8 | 78.7 | 98.1 | 97.7 |
| CZ3PBSi | NiMoPBSi/Y | 54.8 | 78.9 | 99.4 | 98.9 |

The results of Table 6 show that it is advantageous to introduce silicon into the already prepared catalyst rather than in the form of a support containing silicon obtained from a silica-alumina. This is true whether or not the catalyst contains phosphorous. It is thus particularly advantageous to introduce silicon to a precursor already containing group VIB and/or VIII elements and optionally at least one of elements P, B and F.

Catalysts containing an alumina acidified by boron and/or silicon and a globally non dealuminated zeolite are thus of particular importance for partial hydrocracking of a vacuum distillate type feed containing nitrogen at a moderate hydrogen pressure.

EXAMPLE 8

Comparison of catalysts for higher pressure hydrocracking of a vacuum gas oil

The catalysts prepared in Examples 3 and 4 were employed under high pressure (12 MPa) hydrocracking conditions using a petroleum feed with the following principal characteristics:

| Initial point | 277° C. |
|---|---|
| 10% point | 381° C. |
| 50% point | 482° C. |
| 90% point | 531° C. |
| End point | 545° C. |
| Pour point | +39° C. |
| Density (20/4) | 0.919 |
| Sulphur (weight %) | 2.46 |
| Nitrogen (ppm by weight) | 930 |

The catalytic test unit comprised two fixed bed reactors in upflow mode. 40 ml of catalyst was introduced into each of the reactors. Catalyst 1 for the first hydrotreatment step of the process, HR360 from Procatalyse, comprising a group VIB element and a group VIII element deposited on alumina, was introduced into the first reactor, through which the feed passed first. The catalyst for the second step, i.e., the hydroconversion catalyst (CZ5 series), was introduced into the second reactor, through which the feed passed last. The two catalysts underwent in-situ sulphurisation before the reaction. It should be noted that any in-situ or ex-situ sulphurisation method is suitable. Once sulphurisation had been carried out, the feed described above could be transformed. The total pressure was 12 MPa, the hydrogen flow rate was 1000 liters of gaseous hydrogen per liter of injected feed, and the hourly space velocity was 0.9 $h^{-1}$.

The catalytic performances are expressed as the temperature at which a gross conversion of 70% is produced and by the gross selectivity. These catalytic performances were measured for the catalyst after a stabilisation period, generally of at least 48 hours, had passed.

The gross conversion GC is taken to be:

GC=% by weight of 380° $C.^{minus}$ of effluent.

The gross selectivity GS for middle distillates is taken to be:

GS=100* weight of (150° C.–380° C.) fraction/weight of 380° $C.^{minus}$ fraction of effluent.

The reaction temperature was fixed so as to obtain a gross conversion GC of 70% by weight. Table 7 shows the reaction temperature and gross selectivity for catalysts from the CZ5 series.

TABLE 7

Catalytic activities for CZ5 catalysts for hydrocracking

|  |  | T (° C.) | GS (%) |
|---|---|---|---|
| CZ5 | NiMo/Y | 396 | 71 |
| CZ5P | NiMoP/Y | 395 | 71.4 |
| CZ5B | NiMoB/Y | 395 | 71.5 |
| CZ5Si | NiMoSi/Y | 395 | 71.5 |
| CZ5BSi | NiMoBSi/Y | 394 | 71.8 |
| CZ5PB | NiMoPB/Y | 395 | 71.2 |
| CZ5PSi | NiMoPSi/Y | 394 | 71.5 |
| CZ5PBSi | NiMoPBSi/Y | 393 | 71.4 |
| CZ5PBSiF | NiMoPBSiF/Y | 391 | 70.9 |
| CZ5PMn | NiMoPMn/Y | 394 | 71.2 |
| CZ5PMnBSi | NiMoPMnBSi/Y | 393 | 71.3 |
| CZ5PMnBSiF | NiMoPMnBSiF/Y | 390 | 71.2 |

Adding boron and/or silicon to the catalyst containing globally non dealuminated zeolite retained the very high selectivity of catalyst CZ5 with a lower reaction temperature since a gain of 3° C. in the temperature was observed with respect to catalyst CZ5PBSi. Further, if manganese and/or fluorine was added, an improvement in the converting activity was also observed with no degradation of the gross selectivity for middle distillates.

What is claimed is:

1. A catalyst comprising:
   0.1–99.7% by weight of at least one alumina matrix;
   0.1–80% by weight of at least one globally non dealuminated Y zeolite with a lattice parameter of more than 2.438 nm, a global $SiO_2/Al_2O_3$ mole ratio of less than 8, and a framework $SiO_2/Al_2O_3$ mole ratio of less than 21 and more than the global $SiO_2/Al_2O_3$ mole ratio;
   0.1–30% by weight of at least one group VIII metal and/or 1–40% by weight of at least one group VIB metal (% oxide);
   0.1–20% by weight of at least one promoter element selected from the group formed by boron and silicon (% oxide);
   0–20% by weight of at least one group VIIA element;
   0–20% by weight of phosphorous (% oxide);
   0.1–20% by weight of at least one group VIIB element.
2. A catalyst according to claim 1, in which the group VIIA element is fluorine.
3. A catalyst according to claim 1, in which the group VIIB element is manganese.

4. A catalyst according to claim 2, in which the group VIIB element is manganese.

5. A catalyst according to claim 1, wherein the group VIII metal is cobalt, nickel or iron.

6. A catalyst according to claim 1, wherein the group VIB metal is molybdenum or tungsten.

7. A process according to claim 1, comprising 10–98% by weight of the alumina matrix.

8. A process according to claim 1, comprising 15–95% by weight of the alumina matrix.

9. A catalyst according to claim 1, comprising 0.1–60% by weight of the globally non-dealuminated Y zeolite.

10. A catalyst according to claim 1, comprising 0.1–50% by weight of the globally non-dealuminated Y zeolite.

11. A catalyst according to claim 1, comprising 0.1–15% by weight of silicon and boron.

12. A catalyst according to claim 1, comprising 0.1–10% by weight of silicon and boron.

13. A catalyst according to claim 1, comprising 0.1–15% by weight of phosphorus (% oxide).

14. A catalyst according to claim 1, comprising 0.1–10% by weight of phosphorus (% oxide).

15. A catalyst according to claim 1, comprising 0.1–15% by weight of a group VIIA element.

16. A catalyst according to claim 1, comprising 0.1–10% by weight of a group VIIA element.

17. A catalyst according to claim 1, wherein the group VIIB element is rhenium.

18. A catalyst according to claim 1, comprising 0.1–15% by weight of a group VIIB element.

19. A catalyst according to claim 1, comprising 0.1–10% by weight of a group VIIB element.

20. A cylindrical or polylobed extrudate comprising the catalyst according to claim 1.

21. A catalyst according to claim 1, wherein the catalyst has a specific surface area measured by nitrogen adsorption using the BET method of more than 140 m$^2$/g and a pore volume measured using a mercury porisimeter ranging from 0.2–1.5 cm$^3$/g, and doped with phosphorus, fluoride, or the combination thereof.

22. A catalyst comprising:

0.1–99.7 by weight of at least one alumina matrix;

0.1–80% by weight of at least one globally non dealuminated Y zeolite with a lattice parameter of more than 2.438 nm, a global $SiO_2/Al_2O_3$ mole ratio of less than [, and a framework $SiO_2/Al_2O_3$ mole ratio of less than 21 and more than the global $SiO_2/Al_2O_3$ mole ratio;

0.1–30% by weight of at least one group VIII metal and/or 1–40% by weight of at least one group VIB metal (% oxide) wherein a support comprising the at least one globally non dealuminated Y zeolite is impregnated with the at least one group VIII metal and/or the at least one group VIB metal to form an intermediate catalyst, and calcined;

0.1–20% by weight of deposited boron and silicon (% oxide) wherein the intermediate catalyst is impregnated with deposited boron and silicon, dried and calcined to form the catalyst;

0–20% by weight of at least one group VIIA element;

0–20% by weight of phosphorus (% oxide);

0–20% by weight of at least one group VIIB element.

23. A catalyst comprising: 0.1–99.7% by weight of at least one alumina matrix; 0.1–89% by weight of at least one globally non dealuminated Y zeolite with a lattice parameter of more than 2.438 nm, a global $SiO_2/Al_2O_3$ mole ratio of less than 8, and a framework $SiO_2/Al_2O_3$ mole ratio of less than 21 and more than the global $SiO_2/Al_2O_3$ mole ratio;

0.1–30% by weight of at least one group VIII metal and/or 1–40% by weight of at least one group VIB metal (% oxide) wherein a support comprising the at least one globally non dealuminated Y zeolite is impregnated with the at least one group VIII metal and/or the at least one group VIB metal to form an intermediate catalyst, and calcined;

0.1–20% by weight of boron and silicon (% oxide) deposited on the catalyst surface wherein the intermediate catalyst is impregnated with deposited boron and silicon, dried and calcined to form the catalyst;

0–20% by weight of at least one group VIIA element;

0–20% by weight of phosphorus (% oxide);

0–20% by weight of at least one group VIIB element.

24. A catalyst according to claim 22 wherein an intermediate catalyst comprising the at least one globally non dealuminated Y zeolite is doped with deposited boron and silicon.

* * * * *